Feb. 25, 1936. F. W. ADSIT Re. 19,862

TELEVISION DEVICE

Original Filed March 19, 1928 5 Sheets-Sheet 1

Inventor

Frank W. Adsit

By Arnold Fischer

Attorney

Feb. 25, 1936. F. W. ADSIT Re. 19,862

TELEVISION DEVICE

Original Filed March 19, 1928 5 Sheets-Sheet 2

Inventor
Frank W. Adsit

By Howard Fisher
Attorney

Feb. 25, 1936. F. W. ADSIT Re. 19,862
TELEVISION DEVICE
Original Filed March 19, 1928 5 Sheets-Sheet 3
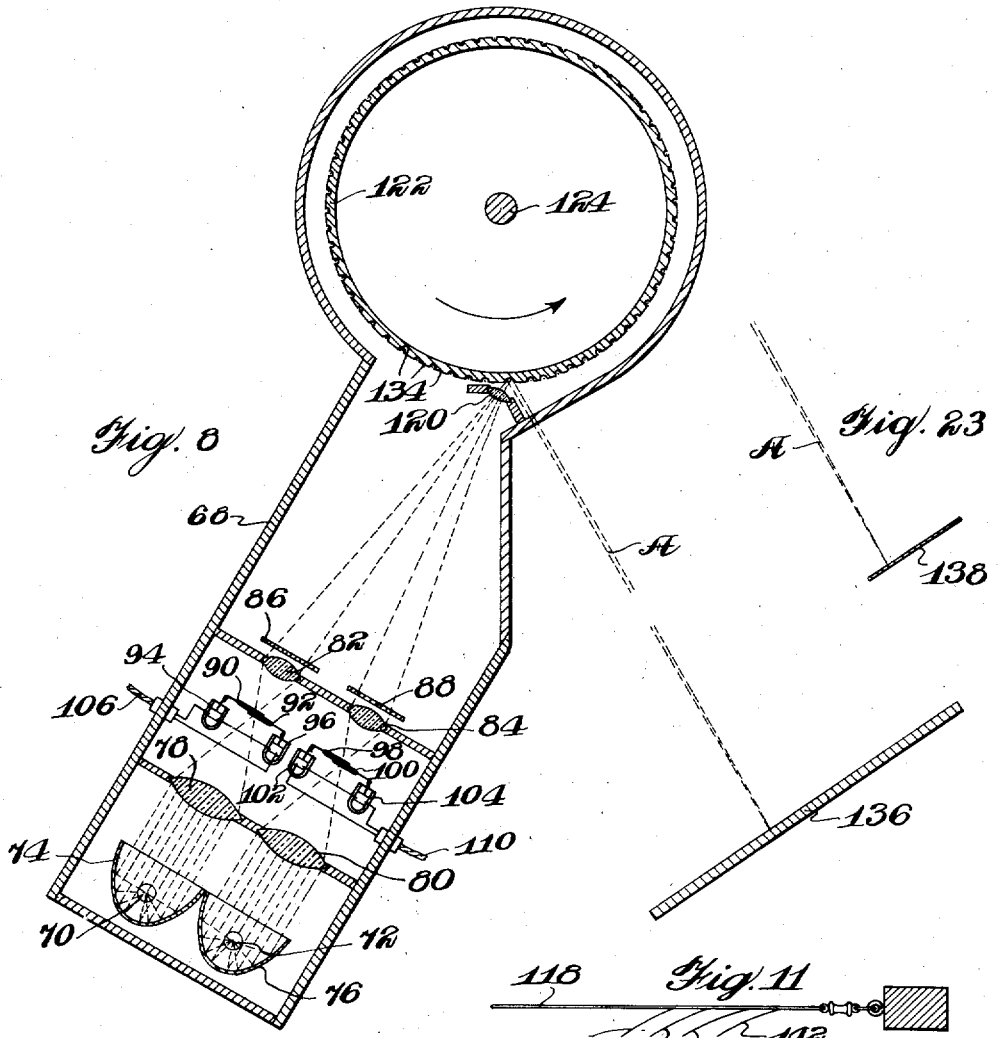
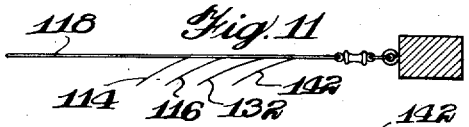
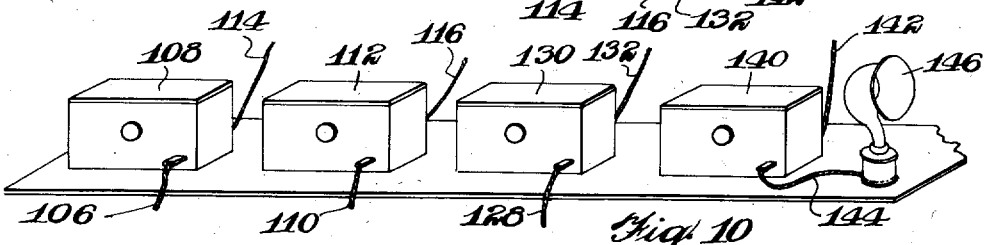
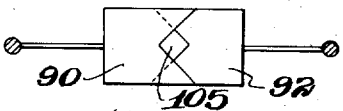
Fig. 9
Inventor
Frank W. Adsit
By Amos Lieber
Attorney Feb. 25, 1936. F. W. ADSIT Re. 19,862

TELEVISION DEVICE

Original Filed March 19, 1928 5 Sheets-Sheet 4

Inventor

Frank W. Adsit

By Howard Richey

Attorney

Feb. 25, 1936. F. W. ADSIT Re. 19,862

TELEVISION DEVICE

Original Filed March 19, 1928 5 Sheets-Sheet 5

Inventor

Frank W. Adsit

By Howard Richey

Attorney

Reissued Feb. 25, 1936

Re. 19,862

UNITED STATES PATENT OFFICE 19,862

TELEVISION DEVICE

Frank W. Adsit, St. Paul, Minn., assignor of one-tenth to James B. Skorstad, Minneapolis, Minn.

Original No. 1,796,420, dated March 17, 1931, Serial No. 262,828, March 19, 1928. Application for reissue March 15, 1933, Serial No. 660,871

7 Claims. (Cl. 178—6)

My invention relates to television devices, and an object in general is to provide a device of this character of simple and efficient construction.

Another object is to provide a device of this character which will reproduce objects in their natural color.

Another object is to provide a device of this character which will bring the multicolored light to a focal point or near a focal point on a reproducing screen.

Another object is to provide a device of this character which will reproduce stereoscopically.

Another object is to provide a device of this character which will reproduce objects in combination with the transmission and reproduction of sound.

Another object is to provide a device of this character which will take television pictures of objects or scenes subjected to natural as well as any flood light.

Another object is to provide a device of this character which will reproduce television pictures by utilizing a source of light of constant intensity.

Another object is to provide a device of this character which will make permanent photographic records including motion picture records.

Another object is to provide synchronizing mechanism for the television taking and reproducing apparatus.

Another object is to provide for making permanent records in the television taking apparatus, which records can be reproduced in the television reproducing apparatus.

The full objects and advantages of my invention will appear in connection with the detailed description thereof, and the novel features of my inventive idea will be particularly pointed out in the claims.

In the accompanying drawings which illustrate an embodiment of the various features of my invention:

Figure 8 (Sheet 3) is a top view of the picture reproducing apparatus.

Figure 9 is a plan view of the shutter device shown in Figure 8.

Figure 10 is a perspective view of a tuning apparatus.

Figure 11 is a fragmentary view of an antenna which may be used in common for all of the tuning members shown in Figure 10.

Figure 23 (Sheet 3) is a fragmentary view of a portion of the apparatus of Figure 8, showing the film and beam of light projecting to the same.

Figure 2:
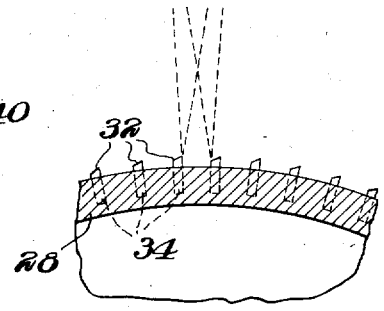
Figure 2 is a fragmentary view on an enlarged scale of a wheel having a succession of small mirrors on its periphery.
Figure 4:
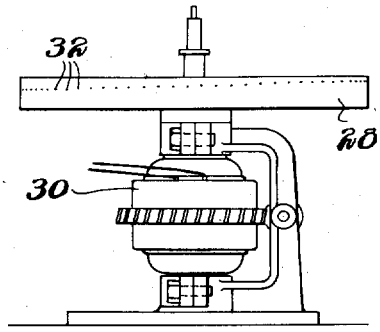
Figure 4 (Sheet 2) is a side elevational view of the wheel and motor rotating the same.
Figure 5:
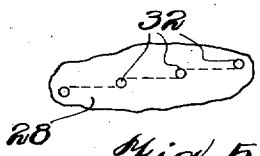
Figure 5 is a fragmentary view of the wheel taken at right angles to Figure 2.

As shown in the drawings, I provide a casing 16 having a front wall 18 and a partition 20 in its forward portion, the front wall and partition being provided respectively with achromatic lenses 22 and 24, respectively, which are in line with each other so as to act on the rays of light passing therethrough in the manner customary with ordinary cameras. A shaft 26 rotatably mounted in the rear portion of the casing 16 carries a wheel 28, the said shaft being driven by an electric motor 30, as shown in Figure 4. The periphery of the wheel 28 carries a multiplicity of small mirrors 32 arranged in the form of one turn of a helix, as will be understood from Figures 4 and 5. Furthermore, these mirrors have an inclined position relatively to a tangent drawn at the circumference of the wheel as will be understood from Figure 2. As shown in this figure, the mirrors thus positioned may be conveniently produced by setting pins 34 in the wheel which are inclined instead of being radially related to the wheel. The protruding ends of these pins are accurately beveled and provided with mirrored surfaces in well known manner. The mirror pins may be of any desired shape and are anchored in radial position with the mirror surface beveled at the desire angle.

Figure 1:
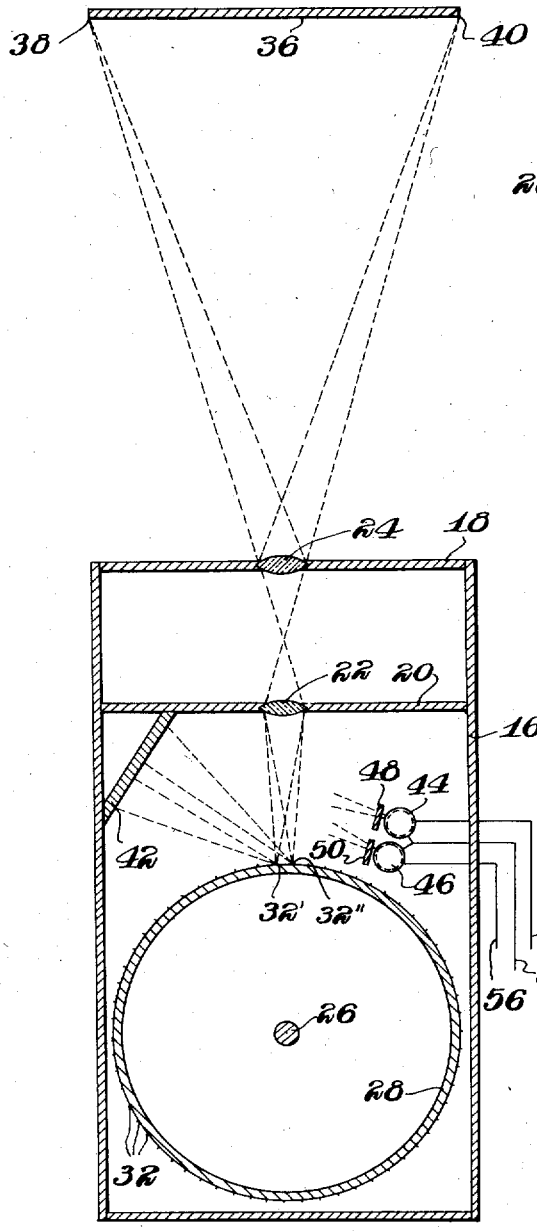
Figure 1 is a top plan sectional view of the picture taking apparatus.
Figure 3:
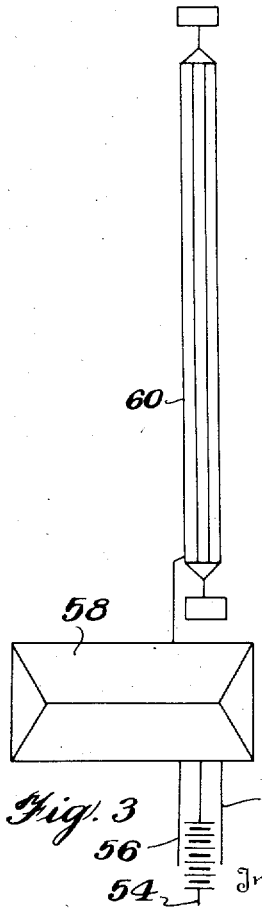
Figure 3 is a plan view of a broadcasting station including the antenna.
Figure 7:
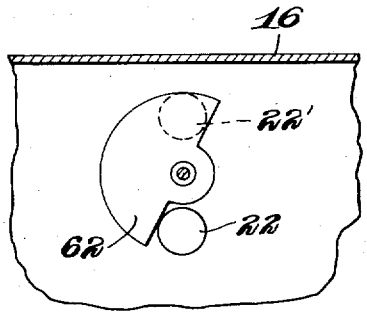
Figure 7 is a fragmentary view of the shutter device shown in Figure 6.
Figure 6:
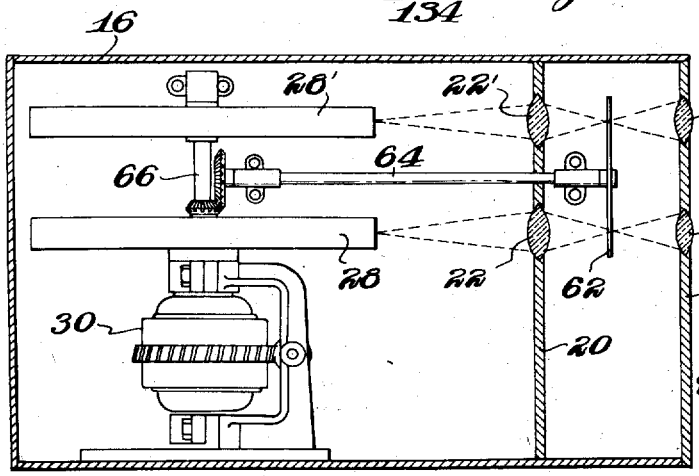
Figure 6 is an elevational view showing two wheels operated synchronously by a motor for stereoscopic purposes.

In Figure 1, the numeral 36 represents an object, the picture of which is to be reproduced by television. The lenses 22 and 24 are focused upon the object 36 to provide a width of image on the wheel 28 equal to the distance between mirrors 32. In the position shown in this figure, rays of light from the points 38 and 40 of the object will be focused by the lenses 22 and 24 alternately upon successive mirrors 32′ and 32″, and as the wheel rotates for the distance between two mirrors, successive points between 38 and 40 will be focused upon the mirrors. Furthermore, on account of the helical arrangement of the mirrors on the wheel, successive points up and down on the object will be focused upon the mirrors so that the entire object will be covered by one rotation of the wheel. On account of the inclined relation of the mirrors previously mentioned, the rays of light will be reflected from the mirrors upon a diffusing screen 42 having an inclined position between the partition 20 and the wall of the casing 16. This casing toward the opposite side thereof from that occupied by the screen 42 is provided with a plurality of photo-electric cells shown in Figure 1 as two in number and designated 44 and 46. These photo-electric cells are at all times exposed to light coming from the screen 42. In order to produce pictures in natural colors, color filters such as 48 and 50, may be interposed between cells and the screen. In order to utilize the variations in current produced in the cells, they are connected to wires such as 52, 54 and 56, which lead to and are connected in well known manner with a broadcasting station 58 having an antenna 60 as shown in Figure 3. The photo cells 44 and 46 operate simultaneously and modulate separate carrier waves. The circuit used is substantially the same as would be used if two microphones were to take their places, both being used simultaneously and broadcast on two carrier waves. If it is desired to produce stereoscopic pictures, the lenses 22 and 24 and the wheel 28 are duplicated as indicated at 22′, 24′, and 28′ in Figure 6, so that two pictures are taken from different angles corresponding to the angular relation existing for the two human eyes. In this arrangement, a shutter 62 is employed which is secured to a shaft 64 driven in synchronism with the wheels just referred to by gearing 66. The shutter 62 is in the form of a semi-disk as shown in Figure 7, and is placed between the outer and inner lenses so as to shut off each set of lenses in alternation. Since only one wheel is exposed to light at any one time, one sending frequency is all that is necessary to transmit from both wheels.

Figure 12:
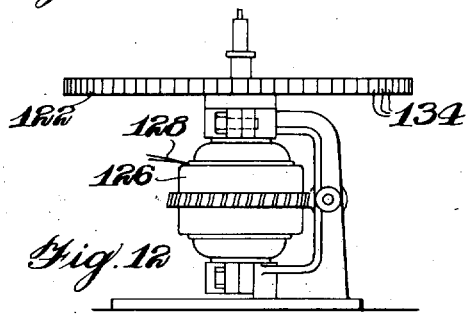
Figure 12 (Sheet 2) is an elevational view of the mirror wheel shown in Figure 8.
Figure 14:
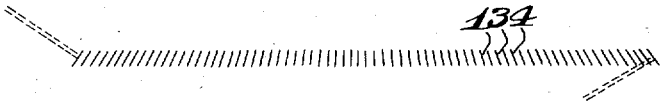
Figure 14 is a view showing a development of the periphery of the mirror wheel for the purpose of illustrating the progressively increasing and decreasing inclination of the various mirrors on the mirror wheel.
Figure 13:
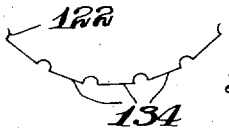
Figure 13 is a fragmentary top view of the mirror wheel drawn with a small radius in order to exaggerate the various angles.

Referring to the reproducing apparatus shown in Figure 8, it will be seen that there is a casing 68 at one end of which two lamps 70 and 72 are placed, these lamps having parabolic reflectors 74 and 76 which reflect the light in parallel rays to lenses 78 and 80, respectively, from which the rays pass to lenses 82 and 84 in front of which are color filters 86 and 88 corresponding to the color filters 48 and 50, previously mentioned. In front of the lens 78, there is a pair of co-operating shutter blades 90 and 92, connected respectively with loud speaker units 94 and 96, while in front of the lens 80 there is a similar pair of co-operating shutter blades 98 and 100 connected respectively with loud speaker units 102 and 104. As will be understood from Figure 9, each of the two co-operating shutter blades has a V-shaped notch in its inner margin and as the blades slide back and forth, the opening 105 between them will gradually open and close. The speaker units 94 and 96 are connected by a cable 106 with a tuning unit 108 for one color, while the speaker units 102 and 104 are connected by a cable 110 with a tuning unit 112 for a different color. These two tuning units are connected respectively by leads 114 and 116 with a common aerial or antenna 118. It will be understood as a matter of course that the number of these color tuning units will be the same as the number of color filters employed since they correspond directly therewith. In order to approximate natural color reproduction, three or more filters may be employed. From the color filters 86 and 88, the rays of light pass to a common lens 120 by which they are focused upon a mirror wheel 122 mounted in the casing and carried by a shaft 124 driven by a synchronous motor 126 shown in Figure 12. The lenses 78, 82 and 120 and the lenses 80, 84 and 120 are in focus. This motor has a connection 128 with a tuning unit 130, connected by a lead 132 with the antenna 118 for keeping the motor in synchronism with the sending motor 30. The wheel 122 has a multiplicity of mirror faces 134 which are the same in number as the number of small mirrors 32, previously referred to. From Figure 14, it will be understood that the arrangement of the mirror faces 134 is such that there is one face which is exactly vertical and that the subsequent faces are progressively inclined more and more as they proceed around the periphery. As will be apparent from Figure 13, there is a small space between the mirror faces. This space is substantially the width of a light beam at the point where it strikes the periphery of the wheel. Accordingly the light strikes but one mirror at a time, preventing a partial image on two parts of the screen at once. In Figure 14, the dotted lines at each end represent a light beam which is reflected upwardly at the left end and downwardly at the right end. In Figure 8, a fixed screen 136 is shown for receiving the light beams A, which are progressively projected so that the television pictures may be observed, while in Figure 23 the numeral 138 designates a film upon which the light beams A may be projected so as to make a permanent record. When the film is moved at the proper speed in the manner in which motion picture films are moved, it may be used to make permanent records of motion pictures. In Figure 10, a tuning unit 140 is shown which is connected by a lead 142 with the antenna 118. This tuning unit is connected by a cable 144 with a loud speaker 146 for reproduction of sound emanating from a sound transmitter of any desired type at the transmitting station.

Figure 15:
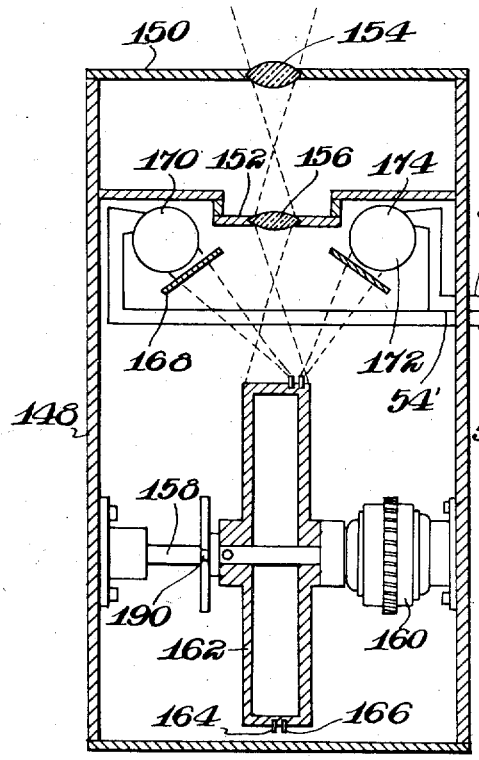
Figure 15 (Sheet 4) is a sectional view of a modified form of picture taking apparatus.

In the form of picture taking apparatus shown in Figure 15, there is a casing 148 having a front wall 150 and a partition 152 in its front portion, this wall and partition being provided respectively with achromatic lenses 154 and 156. A shaft 158 rotatably mounted in the rear portion of the casing 148 is driven by a motor 160, the shaft of which carries a wheel 162. The periphery of the wheel 162 carries a multiplicity of small mirrors arranged in a number of rows, each row constituting one turn of a helix. In the embodiment shown, there are two helical rows designated 164 and 166. The mirrors 164 of one row are beveled in such manner that the light focused thereon by the lenses 154 and 156 is reflected through a color filter 168 upon a photoelectric cell 170. The mirrors 166 of the other row are beveled in such manner that the light focused thereon by the lenses 154 and 156 is reflected through a color filter 172 upon a photo-electric cell 174. The photo cells 170 and 174 usually scan different points of the scene. The mirrors they view are in two different rows. Each row, however, views the entire scene. No reflecting screen is used such as shown in Figure 1, the light being reflected by the mirrors directly into the photo-electric cells so that in this arrangement more of the light is caused to act upon the cells which are connected by wires 52', 54' and 56' with a broadcasting station in a manner similar to that explained in Figure 1. The output of each photo cell modulates a separate carrier wave.

Figure 18:
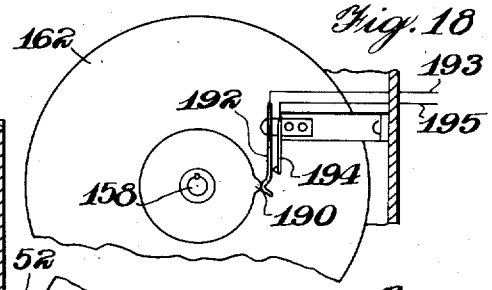
Figure 18 is a detailed view on an enlarged scale of a contact device which is mounted on the motor shaft shown in Figure 15.
Figure 17:
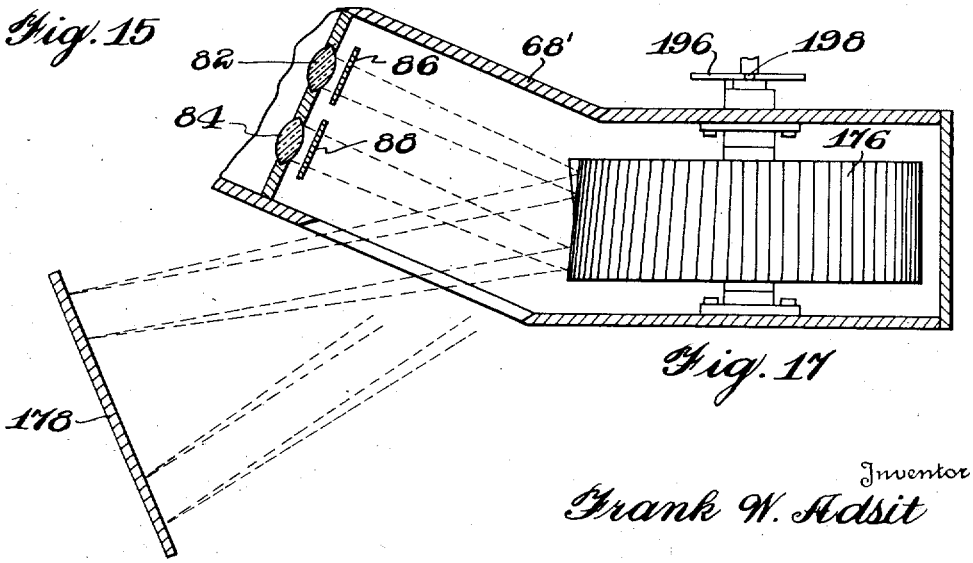
Figure 17 is a sectional view of the picture reproducing apparatus used in this form of the invention.
Figure 20:
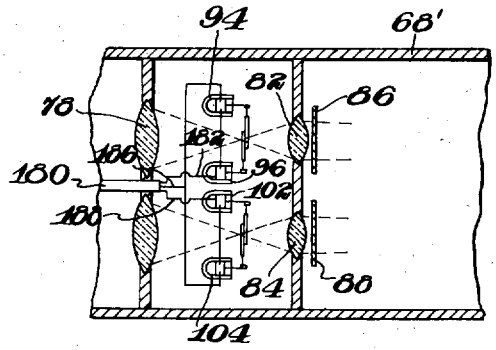
Figure 20 (Sheet 5) is a fragmentary view of light intensity controlling device which may be used in connection with the reproducing apparatus shown in Figure 17.

Figure 17 shows a portion of the reproducing apparatus, it being understood that there is a casing 68', similar to the casing 68 shown in Figure 8. The beam of light passing through the lens 82 and the color filter 86 and the beam of light passing through the lens 84 and the color filter 88 are both directed upon a mirror wheel 176 having a plurality of mirrors around its periphery so inclined as to reflect the beams upon a receiving screen 178. In this form, the two colored beams are not blended to form a colored spot as in Figure 8. The distance between the two beams where they strike the screen 178 is proportionate to the width of the screen just as the distance between the two rows of mirrors in Figure 15 is proportionate to the width of the wheel. This proportionate distance between the beams remains the same at all times. By referring to Figure 20, it will be seen that loud speaker units are used which operate shutter blades in a manner similar to that described in connection with Figure 8. In this case, there is a cable 180 containing three wires 182, 186 and 188. The wire 182 is connected to the unit 96, the wire 188 is connected to the unit 102 while the wire 186 is connected to the two units 94 and 104. Referring again to Figure 15, it will be seen that there is a contact device 190 secured to the motor shaft 158 so as to rotate with the wheel 162. The contact device 190 during each revolution engages a contact finger 192 as shown in Figure 18. The contact finger 192 is connected to a wire 193, while a contact finger 194 is connected to a wire 195, these two wires being bridged to complete a circuit when the contact 190 pushes the finger 192 into engagement with the finger 194. The wires 193 and 195 connect across the wires 52 and 54 leading to the broadcasting station. The photo-electric cell 44 has a much higher electrical resistance than the contact just mentioned with the result that when the contact is made a much stronger impulse is sent out from the broadcasting station than is ever sent out directly from the photo-electric cell 44. This impulse is sent out at the end of each scanning, or each complete revolution. This impulse is on the picture carrier wave. At the receiving end, the shaft of the motor which operates the wheel 176 carries a disk 196 having a projection 198 which passes a fixed electromagnet 200 at each revolution.

The ends of the coil for this electromagnet are connected by wires 204 and 206 across the loud speaker units 102 and 104. If desired, an amplifier can be installed between the coil of the electromagnet 200 and its connection with the loud speaker units. In either case, the impedance of the coil is very high in comparison with the impedance of the speaker units, with the result that it absorbs very little current from the circuit of which it is shunted across while this circuit is carrying high frequency impulses, but would receive quite an impulse once to each revolution due to the excessive energy sent out from the transmitting station once for each revolution of the transmitting motor when the contact shown in Figure 18 is made. The speed of the motor for driving the wheel 176 may be regulated by a hand rheostat so as to run at approximately synchronous speed with the motor of the taking apparatus. The electromagnet 200 is energized each time that the contact fingers 192 and 194 are engaged at the taking end. If the speed of the disk 196 lags slightly, it is pulled into proper place by being drawn ahead by the attraction of the electromagnet, while if it is too speedy, it is pulled back into proper place by the attraction of the electromagnet, and when this position has been secured, it will remain in synchronism.

Figure 21:
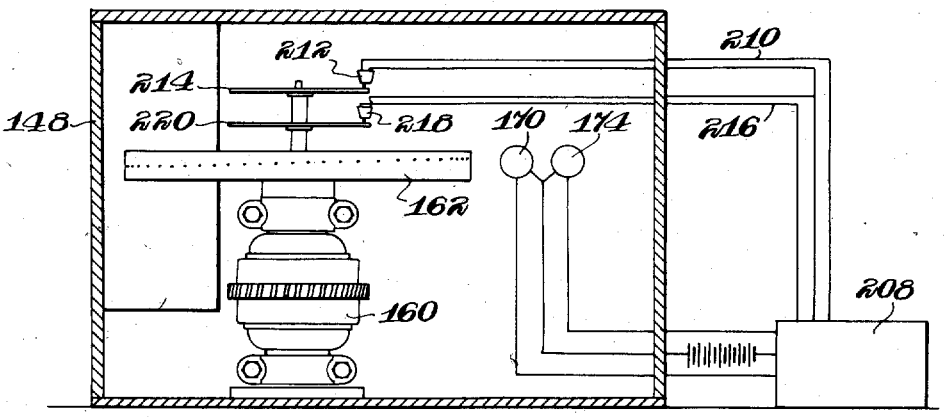
Figure 21 is a view of an apparatus for making wax records of variations of current coming from photo-electric cells.
Figure 22:
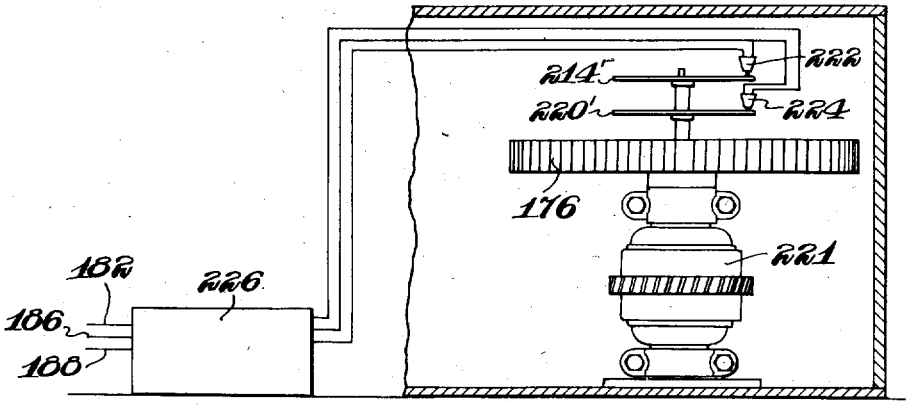
Figure 22 is a view of an apparatus for reproducing the variations in current recorded on the wax records.

Figure 21 shows an apparatus for making wax records of the variations of current sent through the photo-electric cells 170 and 174. In this case, instead of or in addition to broadcasting the television scene, the variations in current sent out from the two cells are amplified by means of an amplifier 208 connected to the cells. From the amplifier, leads 210 for the cell 170 connect with an electrically operated cutting device 212 similar to that used for cutting phonograph records. The cutting device 212 is adapted to operate upon a wax disk 214 secured to shafts of the mirror wheel 162. From the amplifier, leads 216 for the cell 174 are connected with a similar cutting device 218 adapted to operate upon a wax disk 220 secured to the shaft of the mirror wheel. Any number of records can be reproduced from the original records made on the disks 214 and 220. As shown in Figure 22, copied records 214' and 220' can be placed on the shaft of the receiving motor 221. Electromagnetic pickups 222 and 224 associated respectively with the disks 214' and 220' are connected with an amplifier 226 which in turn is connected by the wires 182, 186 and 188 with the shutters shown in Figure 20 for actuating them in the manner previously described.

One purpose in using wax records is as follows: Should there be a time when there is no television program coming in through the receiving end, the operator may employ these picture records and produce a picture program. If the picture record is desired in one color only, then the second record may be used for recording sound. In this case, the sound and picture will be in synchronism with each other since the two records are fastened in a predetermined position on the shaft. If color records are being made, then an additional record may be placed on the shaft for recording the sound.

The operation and advantages of my invention will be apparent in connection with the foregoing description. The device is adapted for taking and transmitting pictures by means of the television taking apparatus, of objects illuminated by either natural or artificial light, and of scenes such as it is now possible to take by means of an ordinary motion picture camera. In addition to taking and transmitting plays such as those ordinarily taken by motion picture machines, the device is adapted for taking and reproducing at a distance, pictures of athletic contests, prize fights, current events, stage plays, bull fights, army and navy maneuvers, and races.

The installation of the television camera in the time of war on an airplane would adapt the device for use in transmitting pictures of the enemies' formations and topographical views. The device is also adapted for use in transmitting telegraphic messages as well as transmitting almost instantaneously facsimiles of various documents, pictures, etc., which at the receiving end of the device can be photographed by either an ordinary camera or a motion picture camera for the purpose of making a permanent record of the original which is being transmitted. Sound may be transmitted also simultaneously with pictures, and pictures may be reproduced in two or more colors and also stereoscopically. For the latter purpose the observer of the pictures reproduced on the screen may be provided with well known form of shutters for the eyes which cover and expose the eyes alternately at the proper speed. Such shutters have been used for viewing motion pictures and hence need not be described in detail. One eye would be exposed to the screen during one revolution of the mirror wheel, the other eye being exposed during the next revolution of the mirror wheel, and so on in alternation. This shutter arrangement would, of course, be shifted in synchronism with the mirror wheel. The reproducing apparatus is capable of reproducing the pictures either on a large or small screen and is adapted to reproduce pictures on a full-sized motion picture screen in motion picture theaters as well as to reproduce the sound in synchronism therewith.

Figure 19:
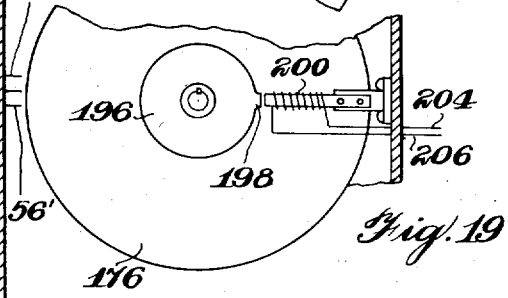
Figure 19 is a detail view of a synchronizing device which is placed at the receiving end of the system.
Figure 16:
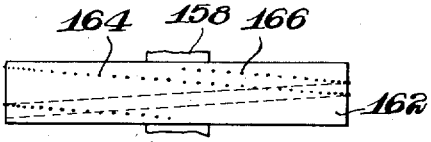
Figure 16 is a plan view of the mirror wheel used in the form of invention shown in Figure 15.

When the principle shown in Figures 18 and 19 is used for synchronizing, it is preferable to eliminate the mirror or mirrors at one position on the circumference both at the sending and receiving end and at this position the contact produced by the member 190 shown in Figure 18 would be made. When this contact is made, it sends a very strong electrical impulse out on the transmitting end while on the receiving end this strong impulse is received at the position where there is no mirror. Obviously, the synchronizing mechanism of my television device may operate in any suitable manner through the closing of the contacts 192 and 194 to operate any electric circuit or circuits through a relay or other common known means to change the intensity of the carrier current for the length of time desired to synchronize the operation and to close the circuit through a relay or well known means for the coil 200 for the short space of time that the carrier current is changed in intensity to synchronize the reproducing means with the sending means for my televison device. In this manner the synchronizing can be carried on on the same wave length with the picture of one of the colors without sending out a special wave length for synchronizing purpose only. If only one color is being transmitted or if the picture is in black and white only, then the television picture and the synchronizing effect can both be transmitted on the single wave length. This eliminates the necessity of sending out an additional synchronizing wave length.

I claim:

1. In a television device, the combination of a rotatable wheel, a multiplicity of pins of equal length protruding from said wheel, small mirrors for receiving light from successive portions of objects as said wheel is rotated formed on said pins, said mirrors being arranged around the periphery of said wheel in the form of a helix and having an inclined position relatively to a tangent drawn at the circumference of the wheel, whereby light reflected by said mirrors is moved in both a horizontal and vertical position, a photo-electric cell, and means for utilizing the currents therefrom to modulate a radio broadcast wave.

2. In a television device, the combination of a rotatable wheel, a multiplicity of pins protruding an equal length from said wheel, small mirrors for receiving light from successive portions of objects as said wheel is rotated formed on the protruding ends of said pins, said mirrors being arranged around the periphery of said wheel in the form of a helix and having an inclined position relatively to a tangent drawn at the circumference of the wheel, whereby light reflected by said mirrors is moved in both a horizontal and vertical position, a screen upon which said light is projected, a photo-electric cell exposed to said screen, and means for utilizing the currents from said cell to modulate a radio broadcast wave.

3. In a television device, the combination of a rotatable wheel, a multiplicity of pins protruding an equal length from said wheel having small mirrors for receiving light from successive portions of objects as said wheel is rotated formed on the protruding ends of said pins, said mirrors being arranged around the periphery of said wheel in the form of a helix and having an inclined position relatively to a tangent drawn at the circumference of the wheel, whereby light reflected by said mirrors is moved in both a horizontal and vertical position, a photo-electric cell, means for utilizing the current therefrom to modulate a radio broadcast wave, a second rotatable wheel having a multiplicity of mirror surfaces around its periphery corresponding in number to the number of said first mentioned mirrors, said surfaces having progressively increasing inclined portions, means for projecting light upon said mirror surfaces corresponding in intensity to the light received from the successive portions of said objects, and a viewing device for receiving the light reflected from said mirror surfaces.

4. A television device including, a rotatable wheel, a multiplicity of pins protruding from said wheel having small mirrors for receiving light from successive portions of objects as said wheel is rotated formed on said pins, being arranged in helical formation each helical row extending around the entire circumference of said wheel to reflect images picked up by said mirrors in horizontal and vertical position, a photo-electric cell, and means for utilizing the currents therefrom to modulate a radio broadcast wave.

5. In a television device, the combination, a multiplicity of pins of equal length each having a mirror surface thereon having a unitary rotatable mounting holding the same in helical formation extending throughout the circumference of the mounting to receive images whereby the images reflected by said mirrors are moved in a horizontal and vertical position by the single reflecting unitary rotatable mounting, a screen upon which the images are projected, a photo-electric cell exposed to said screen, and means for utilizing the currents from said cell to modulate a radio broadcast wave.

6. A television device including, an image sending means having a single unitary reflector element with a multiplicity of pins of equal length each bearing reflectors helically arranged thereon adapted to pick up images in a vertical and horizontal direction, a reproducing means having a single unitary reflector element with a multiplicity of reflectors to project the images onto a viewing screen in the desired relations, a radio carrier wave means for connecting said sending and reproducing means, and a source of strong light directed in a focal beam to the reflectors of said reproducing means, the intensity of the beam being regulated by said radio wave connecting said sending and reproducing means to reproduce the images.

7. A television device including, a rotatable reflecting element comprising a double helical row of pins of equal length extending about the entire circumference of said element each pin having a mirror surface thereon each row operable to reflect an image, and means for picking up the image as reflected by each row of mirrors.

FRANK W. ADSIT.